United States Patent
Fujii et al.

(10) Patent No.: US 7,499,565 B2
(45) Date of Patent: Mar. 3, 2009

(54) METHOD OF WATERMARKING FOR BINARY IMAGES

(75) Inventors: Yasuhiro Fujii, Fujisawa (JP); Kazunori Nakano, Fuji (JP); Isao Echizen, Yokohama (JP); Hiroshi Yoshiura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 635 days.

(21) Appl. No.: 10/841,842

(22) Filed: May 10, 2004

(65) Prior Publication Data

US 2005/0025333 A1 Feb. 3, 2005

(30) Foreign Application Priority Data

Oct. 2, 2003 (JP) ............................. 2003-343917

(51) Int. Cl.
*G06K 9/00* (2006.01)
(52) U.S. Cl. ...................................... 382/100; 709/219
(58) Field of Classification Search ................. 382/100
See application file for complete search history.

(56) References Cited

U.S. PATENT DOCUMENTS

| 5,243,689 | A * | 9/1993 | Yoshiura et al. ................ 706/12 |
| 6,112,234 | A * | 8/2000 | Leiper ......................... 709/219 |
| 6,798,893 | B1 * | 9/2004 | Tanaka ......................... 382/100 |
| 2003/0128861 | A1 * | 7/2003 | Rhoads ......................... 382/100 |
| 2003/0161498 | A1 * | 8/2003 | Oami ........................... 382/100 |

FOREIGN PATENT DOCUMENTS

| JP | 2001-245145 | 9/2001 |
| JP | 2002-057883 | 2/2002 |
| JP | 2002-232687 | 8/2002 |
| JP | 2002-232698 | 8/2002 |

OTHER PUBLICATIONS

S. H. Low et al.; "Document Marking and Identification Using Both Line and Word Shifting"; *IEEE INFOCOM '95: The Conference on Computer Communications*; Apr. 1995; pp. 853-860; vol. 1; IEEE Computer Society Press; California, USA.

Marshall Bern et al.; "Trustworthy Paper Documents"; *LNCS*; c. 2001; pp. 1-12; Springer-Verlag Berlin Heidelberg.

N. Kobori et al.; "One Technology for Digital Watermaking by Pixel Distribution Applicable to Binary Cartoons"; *Journal of the Information Processing Society of Japan*; c. 2001, pp. 596-598; vol. 42, No. 3.

(Continued)

*Primary Examiner*—Samir A. Ahmed
*Assistant Examiner*—Aklilu K Woldemariam
(74) *Attorney, Agent, or Firm*—McDermott Will & Emery LLP

(57) ABSTRACT

A technology of digital watermarking for binary images (including documents) is provided, which is capable of adjusting the amount of information to be embedded while avoiding the deterioration of image quality as far as possible. The watermark information is inserted by giving the standard for judgment of modification and the order of preference for modification according to the characteristic properties of the human visual sense for binary images and performing modification on pixels sequentially in the descending order of preference.

9 Claims, 8 Drawing Sheets

OTHER PUBLICATIONS

E. Yodogawa et al.; "The Cognitive Science of Seeing and Hearing"; *The Institute of Electronics, Information, and Communication Engineers*; c. 1998; pp. 50-52.

E. Yodogawa et al.; "The Cognitive Science of Audio Visual Sense"; *The Institute of Electronics, Information, and Communication Engineers*; c. 1998; pp. 9-13.

E. Yodogawa et al.; "The Cognitive Science of Audio Visual Sense"; *The Institute of Electronics, Information, and Communication Engineers*; c. 1998; pp. 18-21.

Shigeki Yokoi et al.; "Topological Properties in Digitized Binary Pictures"; *IEICE Trans.*; c. 1973; pp. 662-669; vol. 56-D, No. 11.

* cited by examiner

METHOD OF WATERMARKING FOR BINARY IMAGES

INCORPORATION BY REFERENCE

This application claims priority based on Japanese patent applications, No. 2003-57930 filed on March 5, 2003 and No. 2003-343917 filed on Oct. 2, 2003, the entire contents of which are incorporated herein by reference.

BACKGROUND OF THE INVENTION

The present invention relates to a technology of digital watermarking for binary images which is designed to embed arbitrary information in binary images and detect it.

Digital watermarking for binary images is a technology of inverting the luminance value of some pixels at specific positions where modification does not stand out so conspicuous in the digital data of binary images such as documents, tables, and maps, thereby embedding information such as copyright ID in them to protect the copyright of binary images.

The method for embedding information in binary images should meet the following requirements from the practical point of view.

(1) It should be applicable to not only documents consisting solely of characters but also general binary images.

(2) It should be able to embed digital watermarks without being perceived unless watermarking consists of a large amount of information. Alternatively, it should be able to embed digital watermarks without interfering with the recognition of images even though they are perceivable.

(3) It should produce the digital watermarks (embedded information) that can be normally detected from printed paper as well as any images which have been enlarged or reduced.

(4) It should be able to control the amount of information to be embedded.

Among technologies of watermarking for binary images consisting solely of characters, there is known one which is designed to conceal information by subtly changing the character space or line space. See the document 1, S. H. Low, N. F. Maxemchuk, J. Brassil, and L. O'Gorman: "Document Marking and Identification Using Both Line and Word Shifting", INFOCOM vol. 2, pp. 853-860 (1995), for example.

Among conventional watermarking technologies applicable to general binary images, there is known one which is designed to write a special pattern (corresponding to watermarking information) directly in the blank space of background. See the document 2, M. Bern, J. Breidenbach, and D. Goldberg: "Trustworthy Paper Documents", LNCS 2147, pp. 1-12 (2001), for example. Moreover, the document 3 is known, which discloses another method of inserting watermarking information by making minute changes only in the edge of an image where modification is less conspicuous than that in the flat part of an image, N. Kobori, M. Iwakiri, and K. Matsui: "One technology for digital watermarking by pixel distribution applicable to binary cartoons", Journal of the Information Processing Society of Japan, vol. 42, No. 3, pp. 596-598 (2001).

SUMMARY OF THE INVENTION

The technology disclosed in the document 1 meets the third requirement mentioned above because it merely modifies the position information of characters, so that the modified information can be restored correctly even from printed paper. Unfortunately, this technology is applicable only to binary images consisting solely of characters. Therefore, it does not meet the first requirement mentioned above. Moreover, it does not meet the second requirement either because it subtly changes the character space, thereby changing the layout of image. In addition, it does not meet the fourth requirement mentioned above because it embeds the digital watermarks which vary in the amount of information depending on the number of characters in the image.

The technology disclosed in the document 2 meets the third requirement mentioned above, because it is so designed as to write directly in the background a special pattern corresponding to information to be embedded and hence permits information to be detected correctly even from printed paper. It also meets the first requirement because it is applicable to general binary images. However, it does not meet the second requirement mentioned above because it writes information directly in the background and the fact that digital watermarks have been embedded is easily perceived. Moreover, it does not meet the fourth requirement mentioned above because the amount of information to be embedded varies depending on the area of the background.

The technology disclosed in the document 3 meets the first requirement mentioned above, because it is applicable to general binary images. It also meets the second requirement mentioned above when it is applied to an image having many jaggy edges because it modifies only edges. It also meets the third requirement mentioned above because it is somewhat invulnerable to image processing. It also meets the fourth requirement mentioned above because it makes it possible to adjust the amount of information to be embedded by adjusting the number of pixels to be modified.

However, the technology disclosed in the document 3 has the disadvantage of making the edge jaggy as the result of embedding watermarks, thereby deteriorating the image quality accordingly. Therefore, when it is applied to an image which contains only smooth edges, it makes the edges jaggy and the resulting modification interferes with image recognition. In the case of such an image, it does not meet the second requirement mentioned above. Moreover, it may not embed watermark information if an image does not have sufficient edges.

The technology that meets the fourth requirement mentioned above still needs an ability to adjust the amount of information to be embedded according to the anticipated image processing so that the watermarking information is not removed when the image undergoes image processing or the watermarking information does not rely on the structure of the original image (such as the abundance of edges in binary images). Unfortunately, such adjustment is difficult to make in the case of conventional digital watermarking for binary images.

As mentioned above, the conventional technologies of digital watermarking for binary images do not meet the first to fourth requirements all at once.

The present invention provides a technology of digital watermarking for binary images which meets the abovementioned four requirements to a great extent.

The present invention utilizes the fact that an edge is divided into two portions, one which makes modification stand out and the other which does not make modification stand out. For example, modification is not easily perceived when it is made in the originally jaggy portion of an edge but modification is easily perceived when it is made in a smooth line.

The present invention makes it possible to embed as large an amount of information as possible while keeping the image quality at a certain level, by selecting some parts where modification does not stand out and modifying such parts positively.

To be concrete, the procedure for embedding digital watermarks starts with selecting specific pixels whose modification does not stand out and inverting them. If the selected and inverted pixels are less than necessary for embedding the watermarking information required, some other less conspicuous pixels are added and inverted. By repeating this procedure, the technology of the present invention permits more information to be embedded than the conventional technology while keeping the image quality as high as possible.

The conventional technology designed to modify only edges to embed necessary information is limited in the amount of information to be inserted which depends on the quantities of edges in an image. By contrast, the technology of the present invention makes it possible to embed more information by writing information not only in the edges but also in the background if modification of edges alone does not provide as much information as necessary.

As mentioned above, the present invention is characterized by embedding a large amount of information while keeping the image quality as high as possible, by defining the preference in terms of the conspicuousness of modification, which depends on the characteristic properties of the human visual sense, and then inverting only those pixels which have a higher degree of preference.

In this way it is possible to adjust to a greater extent the amount of information to be embedded. Thus, the technology of the present invention meets the fourth requirement mentioned above.

The technology of the present invention is designed to modify the edges and the background; therefore, it can be applied to not only characters but also general binary images. In this sense it meets the first requirement mentioned above. Moreover, the technology of the present invention is designed to modify specific parts which are less conspicuous; therefore, it keeps the best image quality according to the amount of information embedded. In this sense it meets the second and fourth requirements mentioned above. In addition, the technology of the present invention embraces the technology disclosed in the document 3 (involving modification of edges alone). Thus it meets the third requirement mentioned above as it proves.

To practice the present invention, it is necessary to define the preference in terms of the conspicuousness of modification, which depends on the characteristic properties of the human visual sense.

Regarding how modification in binary images stands out, much has been elucidated from the standpoint of cognitive science. For example, according to "Cognitive Science of Audio-visual Sense" by E. Yodogawa, Y. Toukura, and I. Nakane, compiled by The Institute of Electronics, Information, and Communication Engineers, pp. 50-52 (1998), it is said that the human visual sense recognizes binary images by paying attention to irregular parts and continuous parts. For this reason, watermarking (or modification) that gives rise to noise in the background or breaks in the continuous line is easily perceived and is considered to deteriorate the image quality.

Also, in "Cognitive Science of Audio-visual Sense" by E. Yodogawa, Y. Toukura, and I. Nakane, compiled by The Institute of Electronics, Information, and Communication Engineers, pp. 9-13 (1998), the authors maintain that the human eye recognizes an image incident on the retina after smoothing the edge of the image in its direction. (This is referred to as direction selectivity.) Therefore, it is considered that the human eye is sensitive to blurred or jaggy edges and hence does not perceive any modification as deterioration in image quality so long as modification is intended to smooth blurred or jaggy edges in the edge direction.

The human visual sense has characteristic properties known as the "Law of Gestalt" which has been proved by cognitive psychology. This psychological law asserts that the human eye perceives a simple diagram after imaginary conversion into a simpler one. For more detail about the "Law of Gestalt", refer to "Cognitive Science of Audio-visual Sense" by E. Yodogawa, Y. Toukura, and I. Nakane, compiled by The Institute of Electronics, Information, and Communication Engineers, pp. 18-21 (1998).

How disorders in an image stand out may vary depending on the characteristic properties of the human visual sense mentioned above. (1) Irregular parts due to noise-like pixel inversion are most noticeable. (2) Discontinuity of diagrams comes next. (3) Blurred or jaggy edges are less noticeable than (2). On the other hand, (1') Removing noise, (2') Fill gaps in a graphic (which are opposite to (1) and (2), respectively) are least noticeable according to the Law of Gestalt. These procedure and smoothing blurred or jaggy edges should be strongly recommended for image quality improvement, but modification leading to (1) and (2) should be avoided.

With the foregoing taken into account, the method for modification to embed information is given the order of preference as follows in terms of how less noticeable the modification is. See FIG. 2.

(1) To modify so as to remove noise (isolated points) from the background (or the flat part of an image). (For example, modification of image 201 into image 202 in FIG. 2.)
(2) To modify so as to fill gaps in a graphic. (For example, modification of line 211 into line 212 in FIG. 2.)
(3) To modify so as to smooth a graphic in a specific direction (or smooth an edge in its direction). (For example, modification of edge 221 into edge 222 in FIG. 2.)
(4) To modify so as to make a graphic (or edge) jaggy. (For example, modification of edge 222 into edge 221 in FIG. 2.)
(5) To modify so as to form gaps in a graphic. (For example, modification of line 212 into line 211 in FIG. 2.)
(6) To modify so as to form noise (or isolated points) in the background (or the flat part of an image). (For example, modification of image 202 into image 201 in FIG. 2.)

Watermarking by the methods (1) and (2), which have the high order of preference, produces no adverse effect on the image quality. These methods may be used in combination with the methods (3) and (4) if they do not invert as many pixels as necessary for watermarking information. The methods (4) to (6) for modification should preferably be avoided because they are likely to deteriorate the image quality.

Establishing the order of preference for modification according to the characteristic properties of the visual sense eliminates the possibility of the image quality deteriorating due to watermarking and also permits more flexible adjustment for the amount of information to be embedded.

In addition, the present invention is designed to extract modifiable pixels according to the modifying methods (1) to (6), thereby establishing the order of preference. The procedure involves extracting a block of 3×3 pixels, for which the order of preference is to be established, and rapidly collating the binary pattern of the block by using the crossing number, which is a quantity representing the local characteristics of a binary image.

Watermarking information which has been embedded can be detected by specifying the modified pixels through comparison with the original image which has not yet been watermarked. This method, however, is not practicable because it requires the original image to be stored some-where. Therefore, a preferable technology is one which does not need the original image at the time of detection.

The present invention provides a technology which makes it possible to detect digital watermarks without requiring the original image. This technology consists of embedding information in the following sequence as shown in FIG. 7.

(1) Arrange the bit string corresponding to the watermarking information into a two-dimensional block. See block 702.

(2) Superpose the image to be watermarked on a set of the above-mentioned two-dimensional blocks arranged vertically and horizontally. In the set of two-dimensional blocks, bit values are inverted alternately in going from one block to its adjacent one. See image 704.

(3) Invert the image value if the pixel value of the image differs from the value of the superposed bit. Inversion is not performed on all the pixel values differing from the bit value, but inversion is performed only the pixels which are judged to be modifiable according to the order of preference for modification.

The watermarking information which has been embedded as mentioned above can be detected by the following procedure.

(1) Divide the image with watermarks embedded therein into blocks of adequate size corresponding to the watermarking information.

(2) Add the luminance values of mutually adjacent blocks, with their positive and negative signs inverted, and then read the bit string from the thus obtained blocks. See step 705.

Addition in this way (with negative-positive signs inverted) causes the watermarking information (which has been embedded with inversion) to stand out and also causes the information of the original image to disappear. In this way it is possible to extract the embedded information without using the original image.

The present invention covers a method of digital watermarking for binary images, said method consisting of a step of assigning the order of preference to the pattern whose modification is less perceivable to the human eye, a step of finding such a pattern and extracting modifiable pixels, and a step of inverting the luminance value of the extracted pixel, thereby embedding necessary information. This procedure can be implemented by means of computer hardware or software.

The present invention makes it possible to insert watermarking information while keeping the image quality in response to the amount of information embedded.

These and other benefits are described throughout the present specification. A further understanding of the nature and advantages of the invention may be realized by reference to the remaining portions of the specification and the attached drawings.

DETAILED DESCRIPTION OF THE EMBODIMENTS

Figure 1:
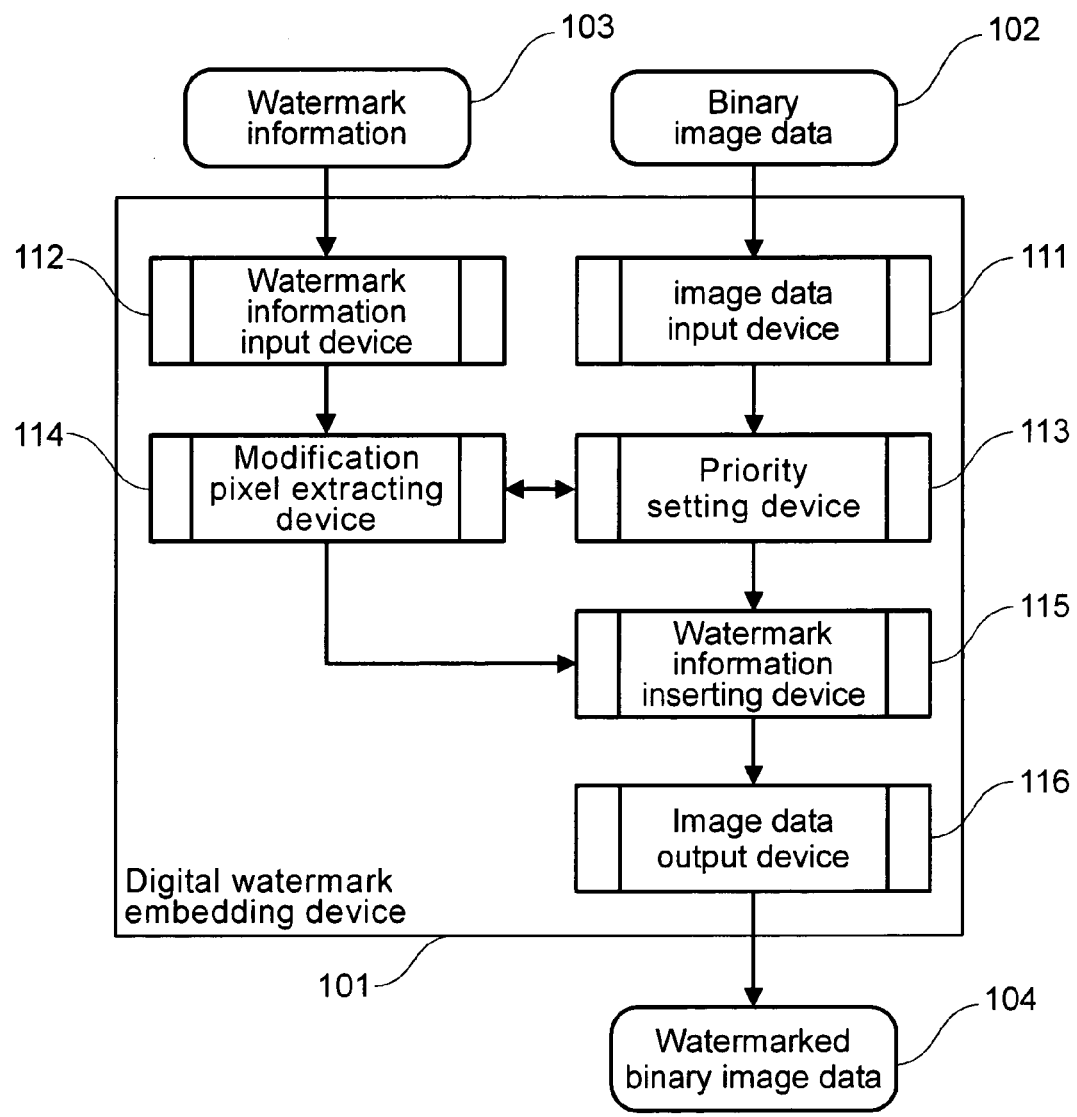
FIG. 1 is a diagram illustrating the constituents of the embodiment of the present invention.

The embodiments of the present invention will be described in the following four sections.
(A) Outline of the device for embedding watermarks.
(B) How to efficiently establish the order of preference for modifiable pixels by using the crossing number which is a quantity representing the local characteristics of binary images.
(C) How to extract modifiable pixels.
(D) Application of the embodiment.
  (A) Outline of the device for embedding watermarks.
  FIG. 1 shows the outline of the device 101 for embedding watermarks. The device may be realized in the form of computer hardware or software.

The image data input device 111 reads the binary image data 102. At the same time, the watermark information input device 112 reads the watermark information 103.

Then, the watermark embedding device 101 sends the binary image data 102 to the priority setting device 113. The priority setting device 113 scans the binary image data 102 and sets up the order of preference for the modification of each pixel in the image.

The modifiable pixel extracting device 114 calculates the number of pixels to be modified from the amount of watermark information 103. Then it calculates the modifiable pixels in the image data 102 by referencing the order of preference of pixels which has been set up in the priority setting device 113.

The watermark information inserting device 115 inverts those pixels, which have been judged as modifiable, according to the results calculated by the modifiable pixel extracting device 114, thereby inserting the watermark information 103 into the image data 102.

The watermark embedding device 101 sends this data to the image data output device 116, thereby outputting the image data into which the watermark information has been inserted. In this way there is obtained the watermarked binary image data 104.

(B) How to efficiently establish the order of preference for modifiable pixels.

Figure 2:
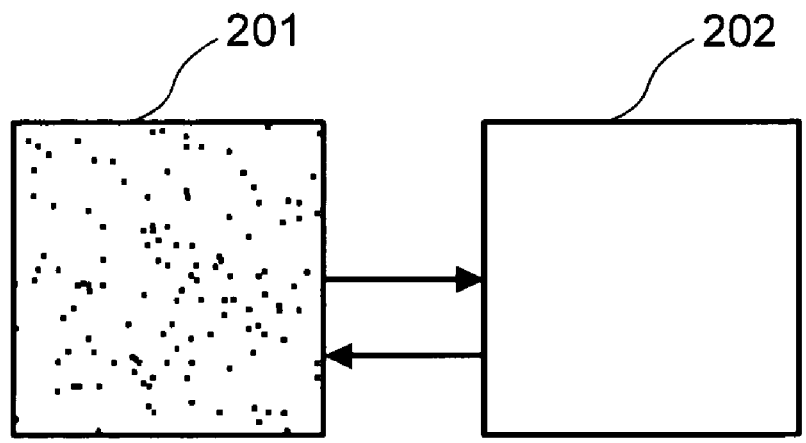
FIG. 2 is a diagram showing some examples of the pixels that can be modified in the embodiment of the present invention.
Figure 2:
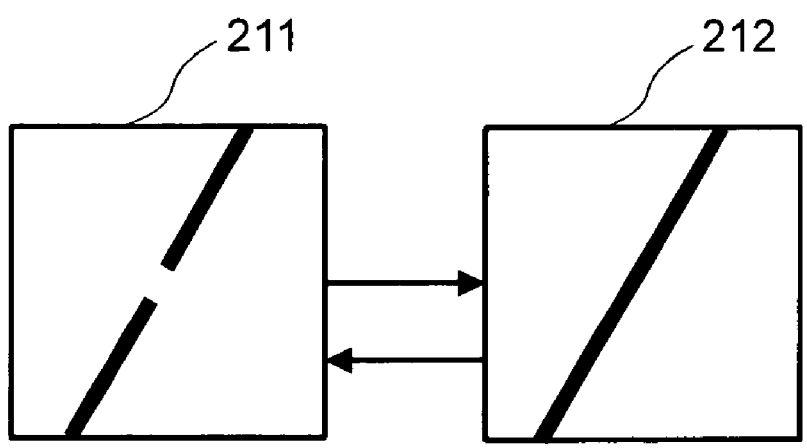
Figure 2:
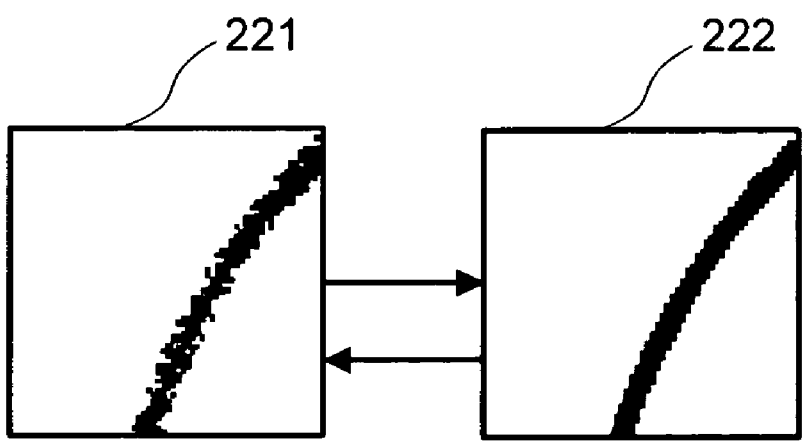

It has been mentioned above that the human eye recognizes that the image quality is improved if scattered noise is removed from the image 201 so as to give the image 202, gaps in the broken line 211 are filled so as to give the continuous line 212, or jaggy edges are smoothed in the image 211 so as to give the image 222 with smooth edges, as demonstrated in FIG. 2. It has also been proved that their reverse operations deteriorate the image quality.

The methods (1) to (6) for pixel modification have been given the order of preference according to the characteristic properties of the visual sense.

The object of finding out modifiable parts according to the characteristic properties of the visual sense is achieved by taking out local blocks surrounding the pixel to be modified and then judging whether or not the pixel at the center of the block should be modified or judging the order of preference according to the pixel pattern within the block. However, making a judgment by pattern matching in this way is not practicable because it requires a large amount of calculations.

In this embodiment, another method is employed to find out efficiently the part to be modified. It is characterized in that the local block is limited to 3×3, and whether or not modification should be made is quantitatively determined from the crossing number (as a quantity representing the local characteristic of binary images) and the total amount of luminance values within the 3×3 block. Incidentally, the crossing number is discussed in the following literature.

S. Yokoi, J. Toriwaki, and A. Fukumura; "On topological properties of sampled binary diagram", IEICE Trans. (Japanese), vol. 56-D, No. 11, pp. 662-669 (1973)

The following terms are defined to describe the criterion for judgment on whether or not modification should be made quantitatively.

Figures 3, 4:
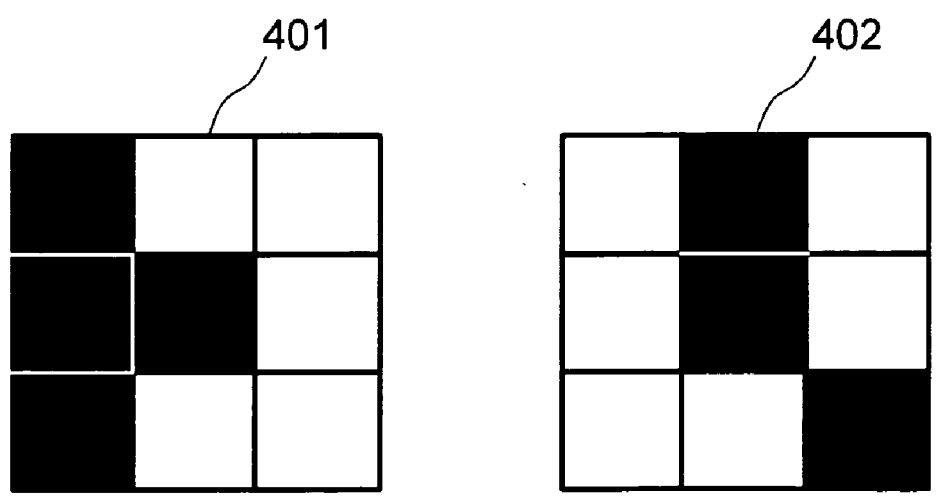
FIG. 3 is a diagram illustrating the numbering of a block to be used for extracting the modifiable pixel in the embodiment of the present invention.
FIG. 4 is a diagram illustrating an example of the blocks used to extract the modifiable pixel in the embodiment of the present invention.

Pixels in a 3×3 block are labeled 0 to 8, as shown in FIG. 3. The central pixel which is labeled 0 is the pixel for which the order of preference is calculated and for which judgment is made on whether or not modification should be made. $f(k)$, $k=0, \ldots, 8$, is assigned to 1 if the kth pixel is black, and to 0 otherwise. In the same way, $g(k)$, $k=0, \ldots, 8$, is assigned to 1 if the kth pixel is black, and to 0 otherwise.

Based on the foregoing definition, the crossing number C is defined as the sum of $f(k+1)g(k)$, $k=1, \ldots, 8$, assuming that $f(9)=f(1)$. The crossing number C defined as above tells how many times the luminance value of pixel transits from white to black after one circling (in the clockwise direction) from $k=1$ to $k=8$ around the central pixel.

Further, the sums of $f(k)$ and $g(k)$, $k=1, \ldots, 8$ (excluding $k=0$) of the central pixel are defined as S and T, respectively. FIG. 4 shows each example of 3×3 blocks (401 and 402) with a black central pixel. In the case of block 401, the sum S of luminance values is 3 and the crossing number C is 1. In the case of block 402, the sum S of luminance values is 2 and the crossing number C is 2.

It is to be noted that the crossing number C depends only on the distribution of pixels in a block but does not depend on the luminance value of the central pixel, the number S of black pixels in a block, and the number T of white pixels in a block. Therefore, by using these quantities, too, it would be possible to narrow down the shape of the edge in the block.

For example, in the case of block 401, which has a crossing number C of 1, a small S value, and a black central pixel, there is the high possibility that black points protrude from the edge because there are many white pixels in the block. Such a pixel can be modified with a high order of preference. Conversely, in the case of a block with a large value of S, there are many black pixels in it and hence there is the high possibility that the central pixel is buried within the edge. In this case, the central pixel has a low order of preference for modification because its modification disturbs the edge. Also, the block 402, which has a crossing number C of 2, is given a low order of preference for modification because inverting its central pixel from black into white breaks the originally continuous line.

Thus, it is possible to restrict the kind of the shape of the block if one knows the value of crossing number C, the sums S and T of the luminance values, and the pixel value of the central pixel. Hence, these values permit one to judge whether or not the specific points should be modified or to derive the order of preference.

It is possible to prove that the above-mentioned conditions (1) to (6) for modification correspond to the following if they are collated with all of the 512 patterns of the 3×3 block.

(1) If C=3 or 4, the central pixel is converted into white.
(2) If C=0 and S=0, the central pixel is converted into white.
(3) If C=1 and $1<=S<=4$, the central pixel is converted into white.
(4) If C=1 and $5<=S<=7$, the central pixel is converted into white.
(5) If C=2, the central pixel is converted into white.
(6) If C=0 and S=8, the central pixel is converted into white.

However, the foregoing is true only in the case where the central pixel is black. The same is true also in the case where the central pixel is white, if S is replaced by T. Incidentally, the numbers (1) to (6) correspond to the order of preference. The larger the number, the lower the order of preference, which leads to deteriorated image quality.

If the foregoing technology is used to scan the entire image pixel by pixel and to calculate the crossing number C and the sums S and T of luminance values for individual pixels, then it is possible to efficiently determine whether or not individual pixels should be modified and the order of preference for modification.

(C) How to extract modifiable pixels.

The method for extracting modifiable pixels will be explained in more detail with reference to the following two examples. The process in these examples is accomplished by using the modifiable pixel extracting device 114 shown in FIG. 1, with the help of computer software or hardware.

Figure 5:
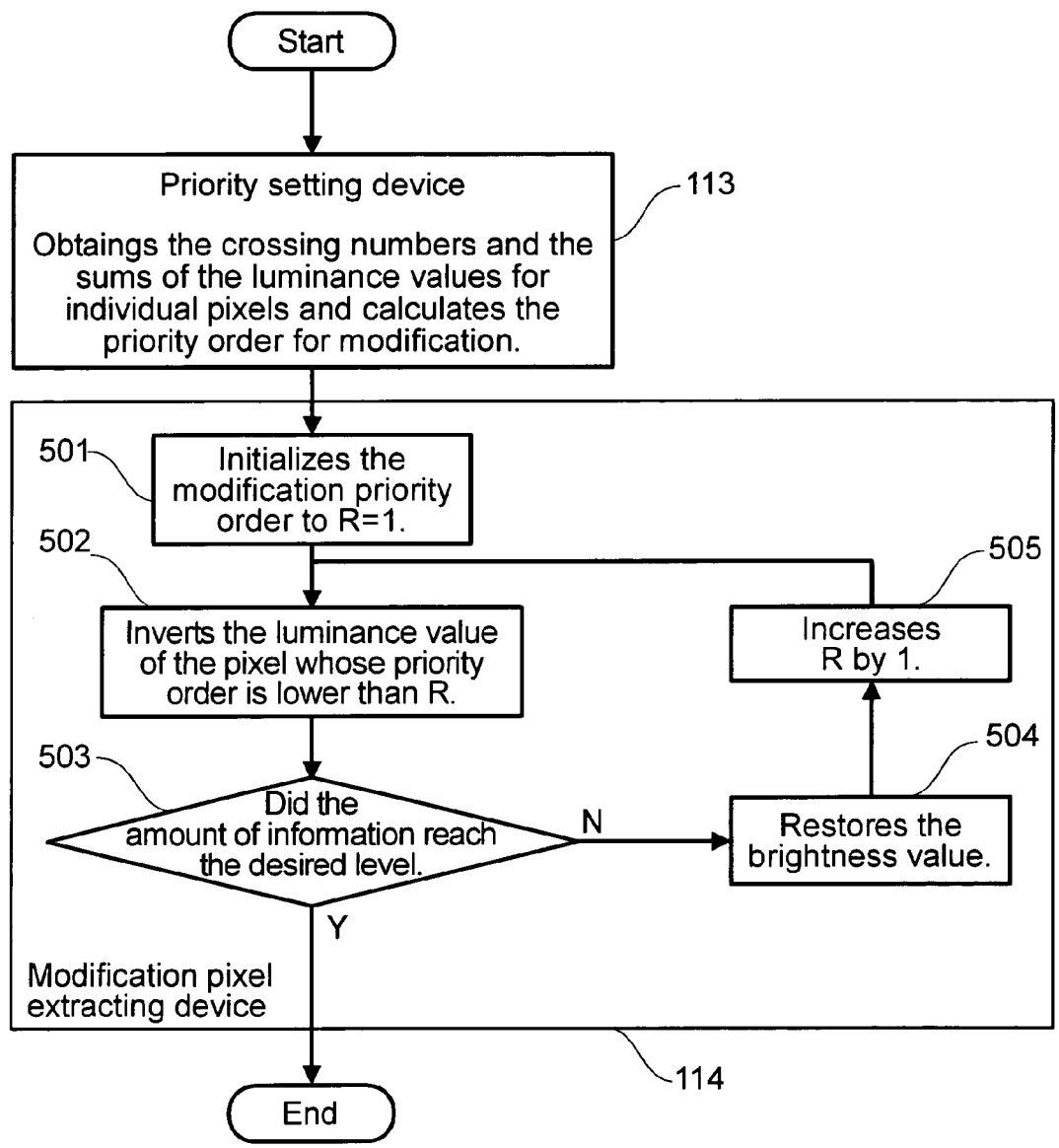
FIG. 5 is an example of the flowchart for inserting watermarking information in the embodiment of the present invention.

The first method for extracting modifiable pixels will be explained with reference to FIG. 5.

First, the priority setting device 113 calculates the order of preference for each pixel. This step may be accomplished by applying the modifying methods (1) to (6) directly or by using an efficient algorithm that employs the crossing number and the sum of luminance values which have been mentioned above.

Then, the modifiable pixel extracting device 114 references the set of modifiable pixels and coverts the luminance of the corresponding original image, thereby inserting the watermarking information.

To be concrete, the modifiable pixel extracting device 114 sets the modification priority order R at 1 in Step 501 and then modifies only the pixel having a higher order of preference than R (or the pixel with the order (1) of preference) in Step 502, thereby inserting the watermarking information.

Then, in Step 503, the modifiable pixel extracting device 114 judges whether or not the watermarked image has as much information as desired. If the modifiable pixel extracting device 114 judges that the watermarked image has as much information as desired, then it outputs the watermarked image and completes the procedure.

If the watermarked image does not have as much information as desired, the modifiable pixel extracting device 114 restores the modified luminance value in Step 504 and augments R by 1 in order to lower the order of preference for modification in Step 505, thereby repeating Step 502 for inserting the watermarking information. Until the desired amount of information is attained, the modifiable pixel extracting device 114 repeats Steps 502, 503, 504, and 505.

If R assumes the maximum value, the watermarks are embedded by the modifying method (6) given in (B). However, the resulting watermarks are very noticeable. In order to avoid this, the modifiable pixel extracting device 114 in Step 502 randomly selects from the pixels which are judged to be modifiable in the modifying method (6) so that the previously established probability of conversion is attained, in order to insert watermarks. If it is judged in Step 503 that the desired amount of information is not reached, Step 502 is repeated, with the probability of conversion gradually increased.

By using the foregoing technology, it is possible to insert watermarking information into a binary image, while keeping the image quality as much as possible, in response to the invulnerability of watermarking required.

Figure 6:
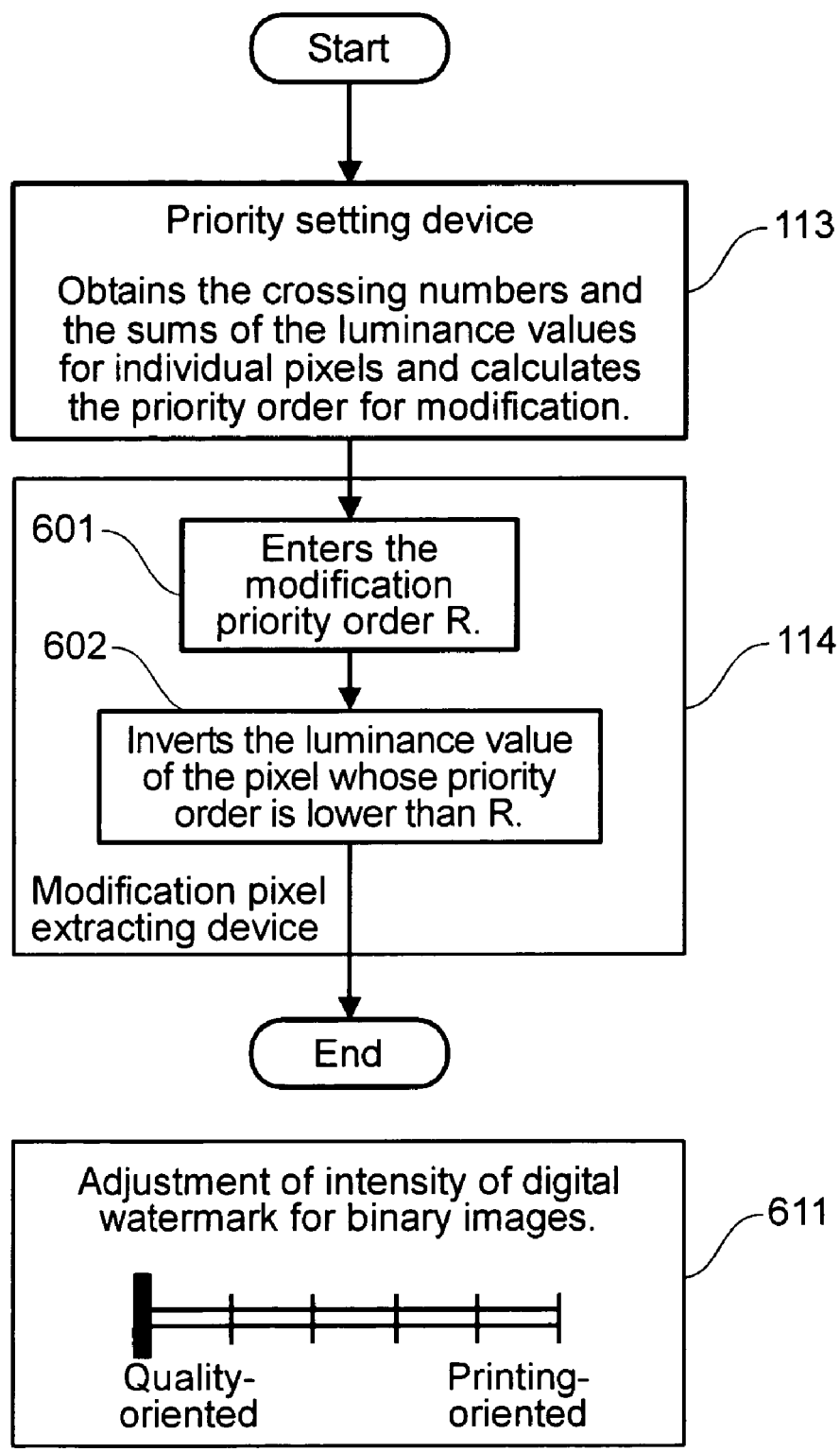
FIG. 6 is an example of the flowchart for inserting watermarking information in the embodiment of the present invention.

The second method for extracting modifiable pixels will be explained with reference to FIG. 6. The procedure in FIG. 6 is the same as that in FIG. 5 except that Steps 503, 504, and 505 are omitted. This procedure is executed by the modifiable pixel extracting device 114.

First, the priority setting device 113 calculates the order of preference for each pixel. As in the foregoing case, this step may be accomplished by applying the modifying methods (1) to (6) directly or by using an efficient algorithm that employs the crossing number.

Then, the user of the device enters the modification priority order R in Step 601. For example, the lowest order is specified as the modification priority order R (where $1<=R<=6$).

In Step 602, the modifiable pixel extracting device 114 modifies the pixel having the order of preference lower than R (which has been entered), thereby embedding the necessary information.

In Step 601, the user specifies a small value of R and performs modification with as high an order of preference as possible, if the image quality is important. However, with a small value of R, the embedding of watermarking information may fail. There may be an instance where the watermarking information is lost as the result of printing detrimental to image quality. If it is desirable to eliminate such possibility and ensure the invulnerability of watermarks, the user adopts a large value of R and embeds a large amount of watermarking information by repetition.

When entering the order of preference for modification, the user may use the interface with a keyword (such as "quality priority" or "suitable for printing") as shown in the dialog 611, instead of simply specifying the order. Unlike the conventional technology of watermarking for binary images, which presents difficulties in adjusting the amount of embedded information or the invulnerability of watermarks, the embodiment of the present invention provides the watermark embedding device 101 which has the interface capable of adjusting invulnerability.

Figure 7:
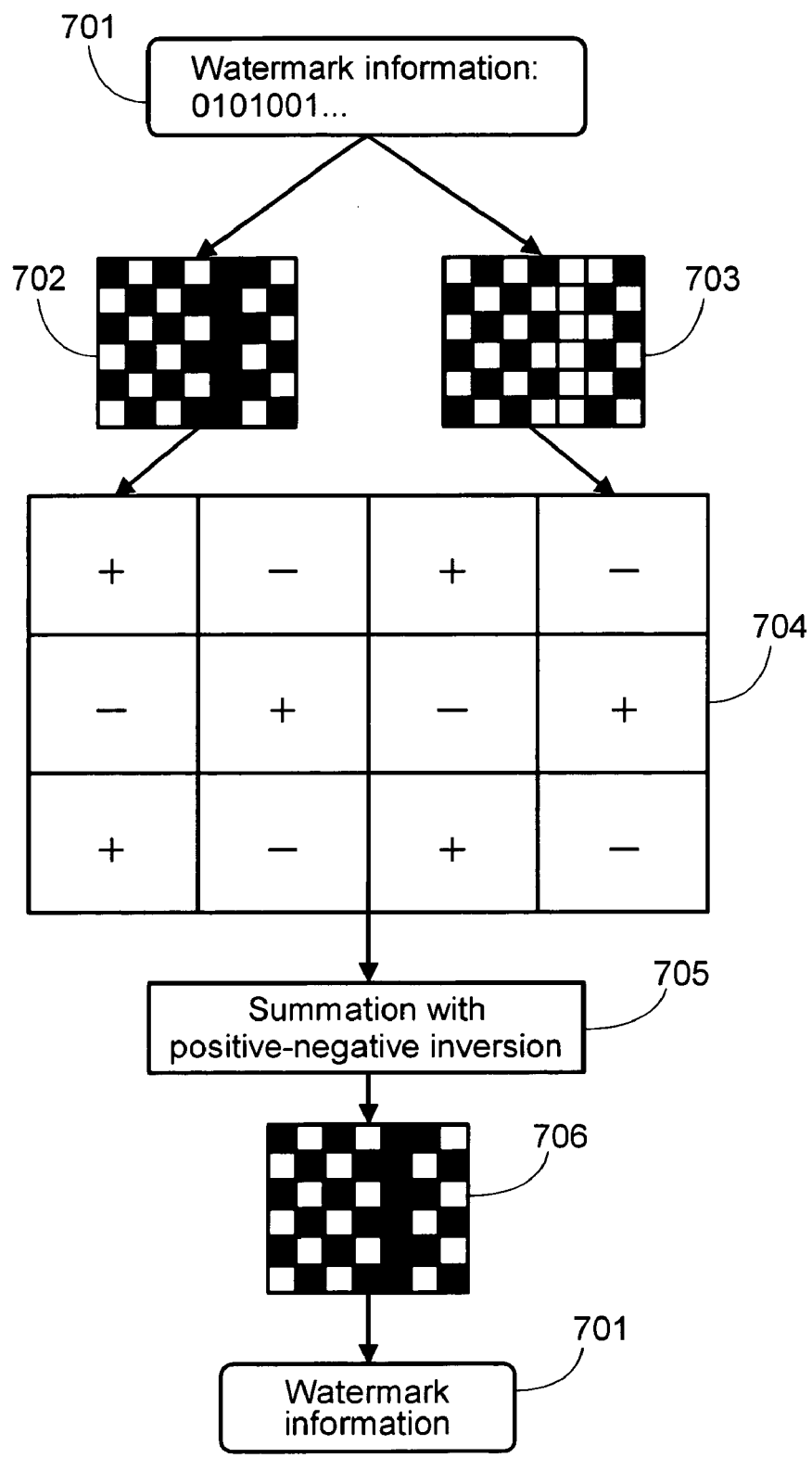
FIG. 7 is a diagram showing an example of the embedding and detection of watermarking information in the embodiment of the present invention.

The method for embedding information, which does not need the original image at the time of detection, will be explained with reference to FIG. 7. The steps for this method are carried out by using the watermark information inserting device 115 shown in FIG. 1.

First, the watermark information inserting device 115 arranges the bit string 701 corresponding to the watermark information in the two-dimensional block 702, with the bit value of 1 assigned to black and the bit value of 0 assigned to white. The shape of the block 702 is previously established such that it is filled completely with the bit string 701. At the same time, the block 703 is formed in which the bit values (0, 1) in the block 702 are reversed.

Then, the watermark information inserting device 115 arranges the blocks 702 and 703 such that they are adjacent to each other as shown in the diagram 704. These blocks are superposed on the image in which the watermarking information is to be embedded.

If a certain pixel in the image to be watermarked is black and its corresponding bit in the superposed block 702 or 703 is white, then the black pixel is converted into white. Likewise, if a certain pixel in the image to be watermarked is white and its corresponding bit in the superposed block 702 or 703 is black, then the white pixel is converted into black. In this way the watermark information inserting device 115 embeds the watermarking information. However, not all the pixel values are reversed in response to the bit values, but only those pixels which have been judged as the object of modification are reversed according to the order of preference for modification.

The watermarking information which has been embedded in this way can be detected correctly by the following procedure without using the original image. The detecting device will be embodied by computer hardware or software.

The detecting device divides the watermarked image into small portions each having the size of blocks 702 and 703 corresponding to the watermark information, as indicated by 704.

In Step 705, the detecting device adds up the luminance values of mutually adjacent blocks, with their signs reversed. The result is that the previously embedded watermark information with reversed signs stands out but the information of the original image is lost. This makes it possible to extract the embedded information without using the original image.

As the result of addition, the block 706 is obtained. The detecting device reads the bit string from the block 706, so that it can detect the embedded information 701 without the necessity for comparison with the original image.

Figure 8:
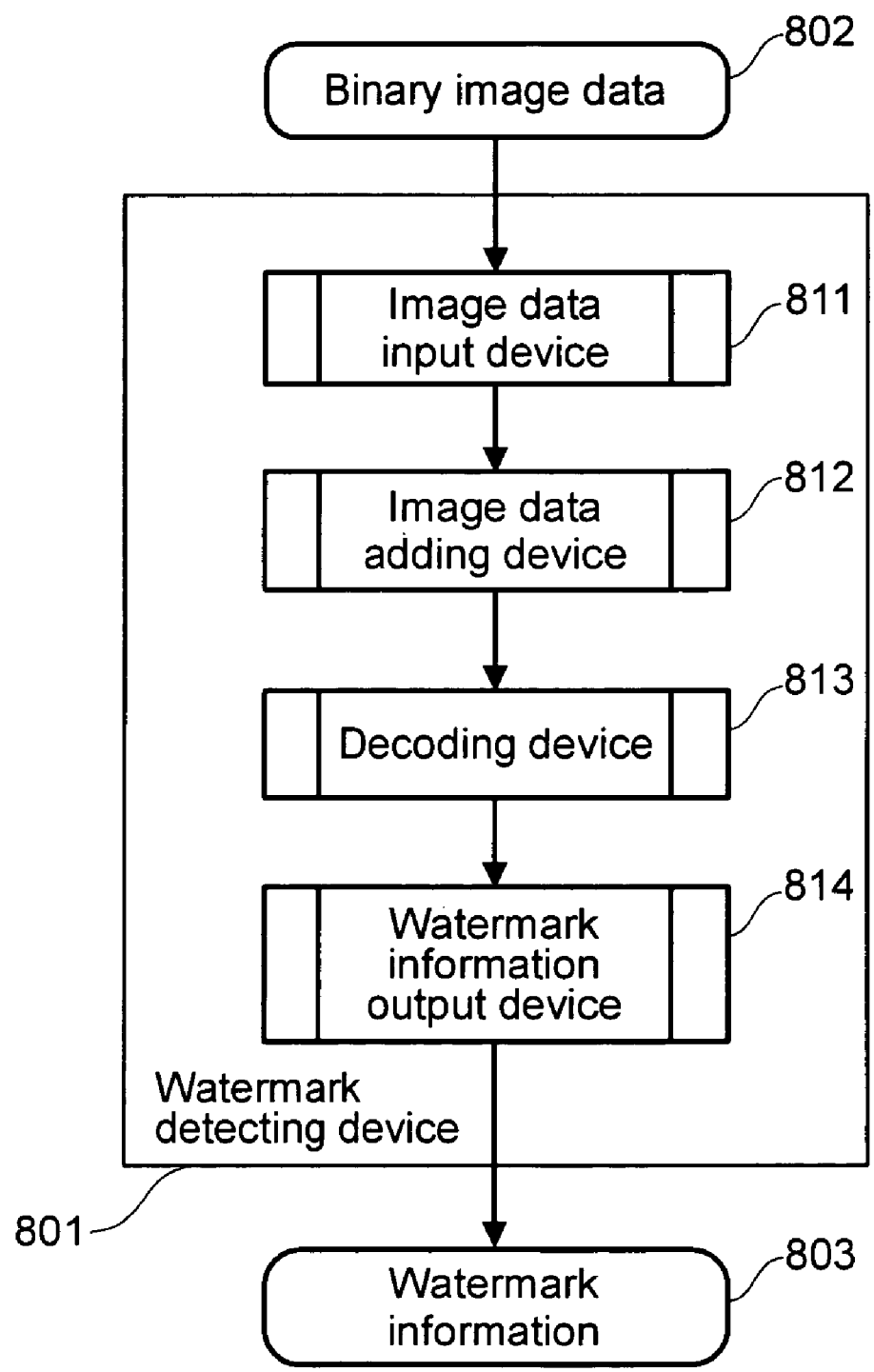
FIG. 8 is a diagram showing an example of the construction of the detecting device in the embodiment of the present invention.

The detecting device is shown in FIG. 8. The detecting device 801 has the image data input device 811, which reads the binary image data 802 from which watermarks are to be detected. The image data adding device 812 adds up the luminance values of mutually adjacent blocks, with their signs reversed, as in Step 705. The decoding device 813 converts the block 706 (obtained by addition) into watermarking information. The detecting device 801 outputs the watermarking information 701 through the information detecting device 814.

Figure 9:
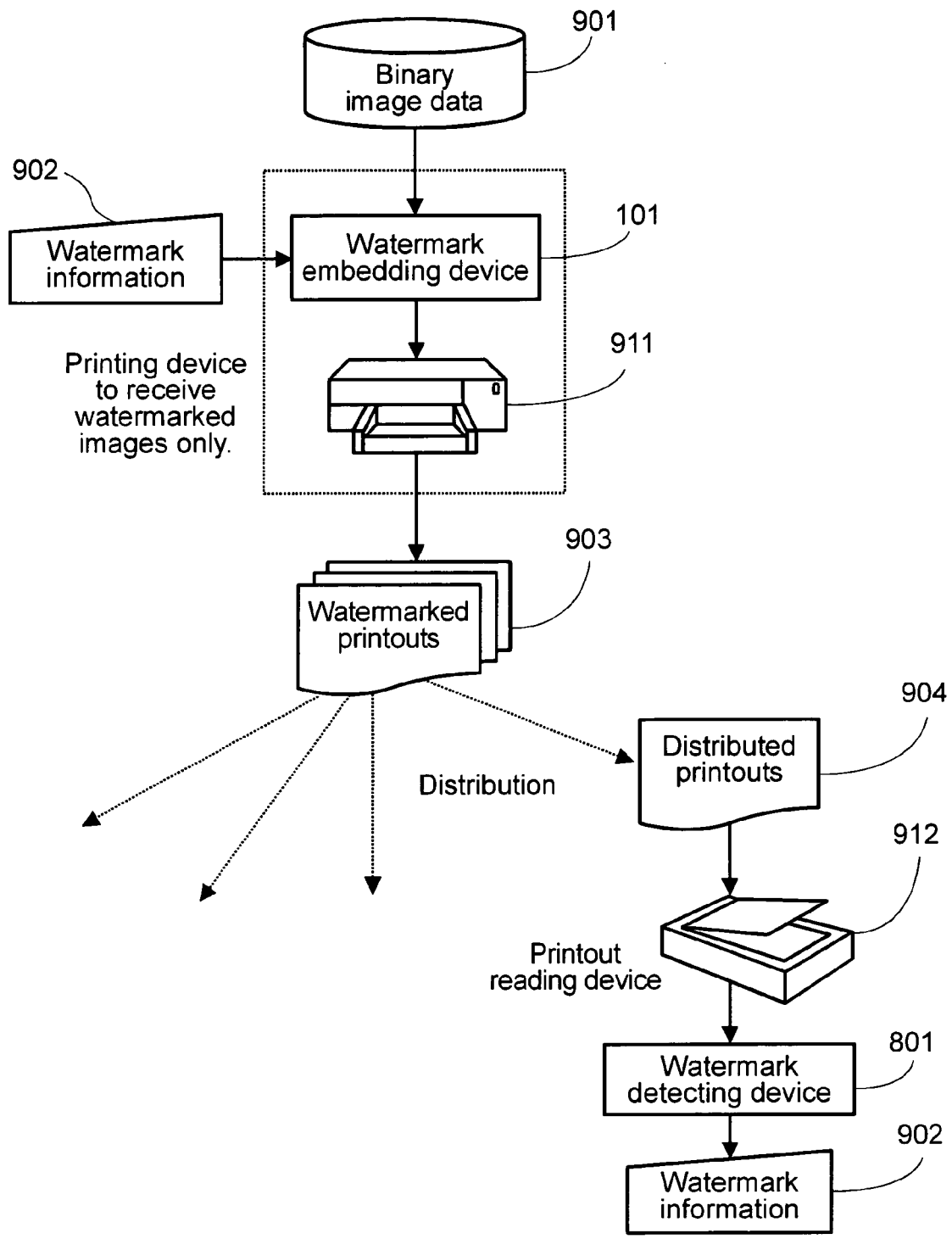
FIG. 9 is a diagram showing an example of the construction of the printing mechanism in the embodiment of the present invention.

(D) A typical application of the embodiment is illustrated with reference to FIG. 9. Highly confidential binary image data (such as certificate) which is under strict control in the electronic domain is easily leaked once it is printed. This trouble is prevented by the embodiment of the present invention.

The system as an application of the embodiment has the watermark embedding device 101 and the printing device 911. The watermark embedding device 101 may be computer hardware or software connected to the printing device 911. The hardware may be built in the printing device 911.

The binary image data is transmitted to the printing device 911 only through the watermark embedding device 101. (It is never transmitted to the printing device 911 directly.) In other words, the printing device 911 receives watermarked images only. This is realized by modifying the driver to send printing data in the computer or providing the hardware with anti-tampering means.

The process as an application of the embodiment works as follows. In order to print the binary image data 901, the user enters the watermark information 902 into the watermark embedding device 101. The user ID that specifies the user is used as the watermark information 902. The result of embedding the user ID is that the information about the user who instructed printing is accompanied by the printed matter.

The watermark embedding device 101 embeds the watermark information 902 in the binary image data 901 by the above-mentioned method of watermarking for binary images and then sends the resulting data to the printing device 911. The printing device 911 outputs the printed matter in which the watermark information 902 has been embedded.

It is desirable that the embedded watermark should have more modified pixels than necessary so that the embedded information is not lost when it is printed on paper, by specifying a low order of preference for modification, with importance attached to invulnerability rather than image quality. Although printed matter could be leaked for illegal distribution more easily than electronic data, the application of the embodiment can prevent the threat.

It is assumed that the printed matter 903 containing confidential data is illegally leaked and its distribution is found. Then, the finder or detector reads the found printed matter 904 by means of the printed matter reading device 912, for conversion into electronic data. He enters the resulting electronic data into the watermark detecting device 801 (described above with reference to FIG. 8). The watermark detecting device 801 attempts to detect the watermark. As the result, it detects the watermark information 902 which has previously been embedded by the watermark embedding device 101. Since the watermark information 902 is the user ID, it is possible to specify the person who made the printed matter 904 and hence to specify the origin from which the data was illegally leaked.

The above-mentioned embodiment will prevent the illegal leakage because it is able to specify the person who has leaked the printed paper.

Although the printing device 911 is used in this embodiment, the same effect as above will be produced even when it is replaced by a copying machine. In this case, the system will ask the user who makes copies to enter his ID so that the user ID as the watermarking information 902 is embedded in the copies. In this way it is possible to prevent the illegal leakage of copies. Incidentally, the watermark embedding device 101 should be built in the copying machine because the manuscript read by the scanner is converted into electronic data inside the copying machine. The copying machine should be provided with a tamper-preventing means so that the watermark embedding device will not be removed or tampered.

Alternatively, the copying machine may be built into the watermark detecting device 801 which has been provided with the tamper-preventing means. In this case, the original to be copied is examined for watermarks in the copying machine, and if the fact that the user ID has been embedded as the watermark information 902 is found, then the copying machine suspends copying operation, thereby preventing the distribution of illegal copies.

In the above-mentioned application of the embodiment, it is desirable to embed watermarks by adequately adjusting their strength, with importance attached to invulnerability rather than quality.

Incidentally, in the above-mentioned embodiments, the program to be executed by the computer may be stored in the computer storage or a removable recording medium to which the computer is accessible, or may be introduced from any other device through a communication medium (or network) or wireless transmission.

The specification and drawings are, accordingly, to be regarded in an illustrative rather than a restrictive sense. It will, however, be evident that various modifications and changes may be made thereto without departing from the spirit and scope of the invention as set forth in the claims.

What is claimed is:

1. A method of embedding a bit stream of information into binary images by a computer, the method comprising steps of:

setting by the computer a priority of modification for each pixel in the binary image according to how much the modification of the pixel stands out, setting by the computer a lower bound of the order of preference priority of modification according to required strength of the embedding in advance for embedding the information, specifying by the computer a candidate pixel for embedding a bit value of the information by inverting the bit value thereof in the binary image, by making correspondence bit values of the information with pixels of the binary image one by one and comparing each bit value comprising the information to be embedded with the bit value of each pixel, specifying by the computer a pixel to be modified in a case in which the priority of modification of the pixel is equal to or higher than the lower bound of priority, and embedding the information by the computer inverting the values of the specified pixels to be modified.

2. The method of embedding information as defined in claim 1, wherein specifying a pixel to be modified includes assigning a bit value of the information to the plural pixels in the binary image, wherein embedding the information includes inverting pixels having equal to or higher priority of modification than the lower bound of priority.

3. The method of embedding information as defined in claim 2, wherein embedding the information includes:

lowering the lower bound of priority in the case where the information has not been embedded at a certain lower bound of priority, restoring the values of the pixels to which information has been embedded in embedding the information at the previous lower bound of priority, and specifying pixels to be modified and embedding the information at the lowered lower bound of priority.

4. The method of embedding information as defined in claim 1, wherein setting priority of modification includes determining a type of each of the pixel from, a first type that is the isolated point appearing in the flat part in the binary image;

a second type that is a gap in a graphic in the binary image;

a third type that smoothes a graphic in the binary image along a direction of the graphic, a fourth type that makes a graphic in the binary image jaggy, or a fifth type that makes a gap in a graphic in the binary image.

5. The method of embedding information as defined in claim 4, wherein setting priority of modification includes assigning priorities to the first type, the second type, the third type, the fourth type, and the fifth type in descending order.

6. The method of embedding information as defined in claim 5, wherein setting priority of modification further includes determining whether each of the pixel is a sixth type that modification thereof generates an isolated point in the background of the binary image, and wherein in the case where the information has not been embedded even though at the lowest lower bound of priority, embedding the information includes randomly inverting the values of the sixth type of the pixels in the binary image such that they have a predetermined inversion probability.

7. The method of embedding information as defined in claim 6, wherein embedding the information further includes:
   raising the inversion probability, in the case where the information has not been embedded at the predetermined inversion probability,
   restoring the values of the pixels to which information has been embedded in embedding the information before the inversion probability is raised, and
   randomly inverting a bit value of the sixth type of the pixels in the binary image in the raised inversion probability.

8. The method of embedding information as defined in claim 4, further comprising:
   setting priority of modification includes determining the type of the target pixel to be set the priority of modification, based on the target pixel value and a distribution of the pixels around the target pixel,
   wherein the method of embedding information takes out a block consisting of 3×3 pixels from the pixels for which the modifiability is to be judged and judges from the crossing number of the block and the sum of the luminance values whether or not the pixels are gaps in the graphic, and
   wherein the method of embedding information takes out a block consisting of 3×3 pixels from the pixels for which the modifiability is to be judged and judges from the crossing number of the block and the sum of the luminance values whether or not the pixels are pixels to be smoothed.

9. The method of embedding information as defined in claim 1, wherein embedding the information includes:
   arranging the bit string of the information in a two-dimensional block,
   arranging the two-dimensional blocks vertically and horizontally by alternating the two-dimensional block and the bit-value-inverted two-dimensional block, thereby associating the arranged two-dimensional blocks with the binary image, and
   inverting the value of the pixels specified in the specifying pixel extracting step according to the bit value of the corresponding two-dimensional block.

* * * * *